United States Patent
Donehue

(10) Patent No.: US 8,181,518 B1
(45) Date of Patent: May 22, 2012

(54) FLOAT FOR LIQUID LEVEL INDICATOR

(76) Inventor: Wade L. Donehue, League City, TX (US)

( * ) Notice: Subject to any disclaimer, the term of this patent is extended or adjusted under 35 U.S.C. 154(b) by 435 days.

(21) Appl. No.: 12/592,196

(22) Filed: Nov. 20, 2009

(51) Int. Cl.
*G01F 23/76* (2006.01)
*G01F 23/72* (2006.01)

(52) U.S. Cl. .................. 73/322.5; 73/313; 73/319

(58) Field of Classification Search ............ 73/313, 73/319, 322.5; 116/110, 228
See application file for complete search history.

(56) References Cited

U.S. PATENT DOCUMENTS

| | | | |
|---|---|---|---|
| 4,848,745 A | | 7/1989 | Bohannan et al. |
| 5,743,137 A | * | 4/1998 | Brown et al. .......... 73/322.5 |
| 6,435,026 B1 | | 8/2002 | Donehue |

* cited by examiner

*Primary Examiner* — Herzon E Williams
*Assistant Examiner* — Paul West
(74) *Attorney, Agent, or Firm* — John R. Casperson

(57) ABSTRACT

A magnetic float is provided for a level indicator system that is suitable for low density liquids at high pressure, such as C3-liquids. The float comprises a hollow tube, first and second endcaps, and a magnet assembly. The hollow tube comprises a carbon fiber reinforced cured resin matrix and has a first end, a second end, and a longitudinal axis extending between the ends. The first and second endcaps are formed from polymer and dome-shaped. They seal the first and second ends of the hollow tube, respectively, to hermetically seal the inside of the float the outside. At least one polymeric reinforcing ring is mounted inside of a midsection of the hollow tube between the first end and the second end to resist radial inward collapse of the tube. The magnet assembly is mounted in the tube near the first endcap and comprises a plurality of longitudinally elongated magnets positioned adjacent the inside wall of the hollow tube. Each magnet has a longitudinal axis positioned parallel to the longitudinal axis of the hollow tube and is circumferentially spaced from the other magnets.

13 Claims, 2 Drawing Sheets

FLOAT FOR LIQUID LEVEL INDICATOR

FIELD OF THE INVENTION

In one aspect, this invention relates to a float for liquid level indicator of the type having a magnetized float which moves as the level of liquid changes.

BACKGROUND OF THE INVENTION

Liquid level indicators which employ a magnetized float generally employ one or more optical indicator elements triggered by the magnets in the float and/or another type of magnetic proximity sensor such as a magnetostrictive wire operating to produce a level signal in a readout device.

Prior art level indicators of the magnetic float type were generally not satisfactorily reliable in situations where high pressure surrounded the float and/or where the liquid carrying the float was of low density. Liquefied light hydrocarbons commonly exist as low density liquids in high pressure vessels in the petroleum and petrochemical industries and heretofore have not lent themselves well to level measurements with magnetic float devices.

OBJECTS OF THE INVENTION

It is an object of this invention to provide a magnetic float for a liquid level indicator which provides satisfactory service in high pressure, low liquid density applications.

It is a further object of this invention to provide a magnetic float for a liquid level indicator which is useful and reliable for measuring the liquid levels of liquefied $C_3$-hydrocarbons at high pressure.

SUMMARY OF THE INVENTION

In one embodiment of the invention, there is provided a magnetic float for a level indicator system. The float comprises a hollow tube, first and second endcaps, and to a magnet assembly. The hollow tube comprises a carbon fiber reinforced cured resin matrix and has a first end, a second end, and a longitudinal axis extending between the ends. The first and second endcaps are formed from polymer and are dome-shaped. They seal the first and second ends of the hollow tube, respectively, to hermetically seal the inside of the float the outside. At least one polymeric reinforcing ring is mounted inside of a midsection of the hollow tube between the first end and the second end to resist radial inward collapse of the tube. The magnet assembly is mounted in the tube near the first endcap and comprises a plurality of longitudinally elongated magnets positioned adjacent the inside wall of the hollow tube. Each magnet has a longitudinal axis positioned parallel to the longitudinal axis of the hollow tube and is circumferentially spaced from the other magnets.

DETAILED DESCRIPTION OF THE INVENTION

Figure 1:
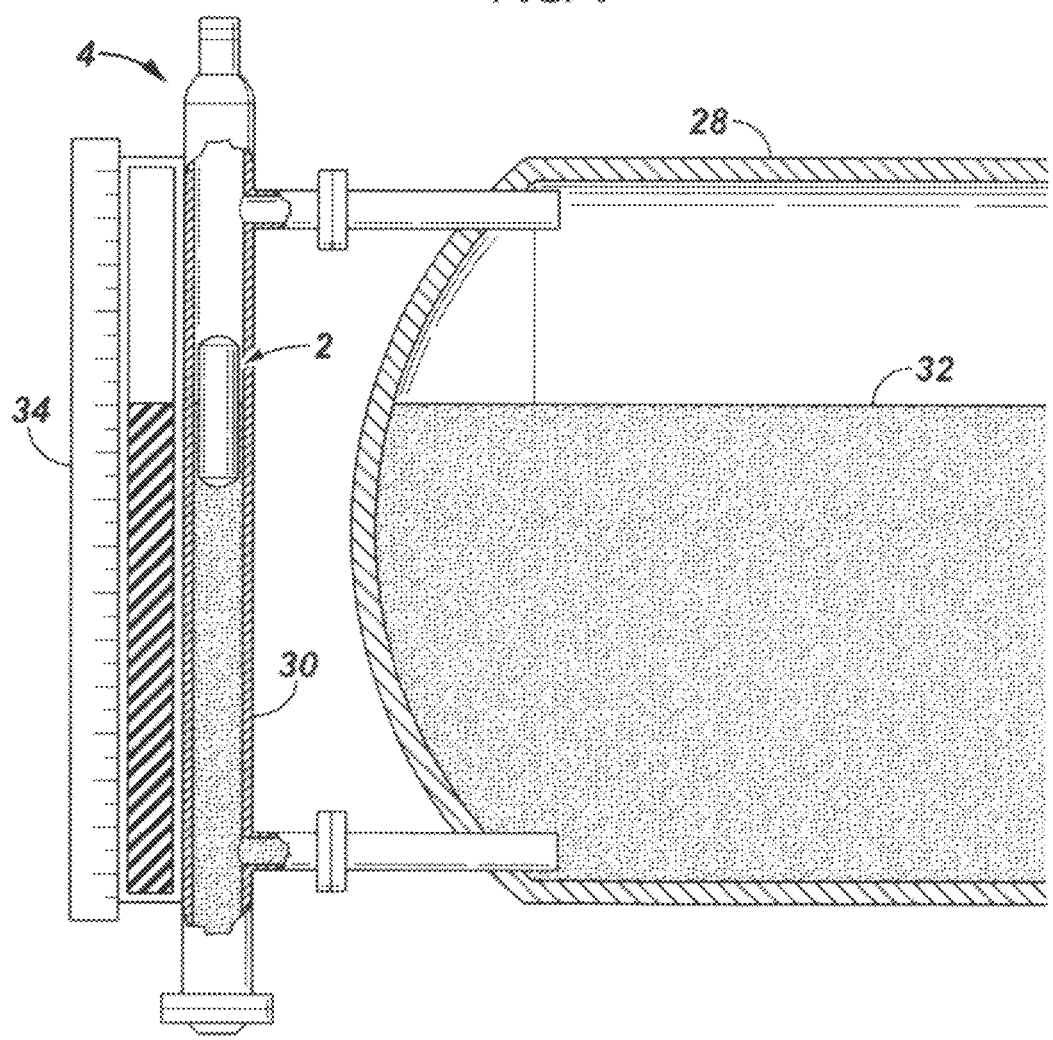
FIG. 1 is a pictorial illustration, partly in cross section, illustrating a float according to one embodiment of the invention in use.
Figure 2:
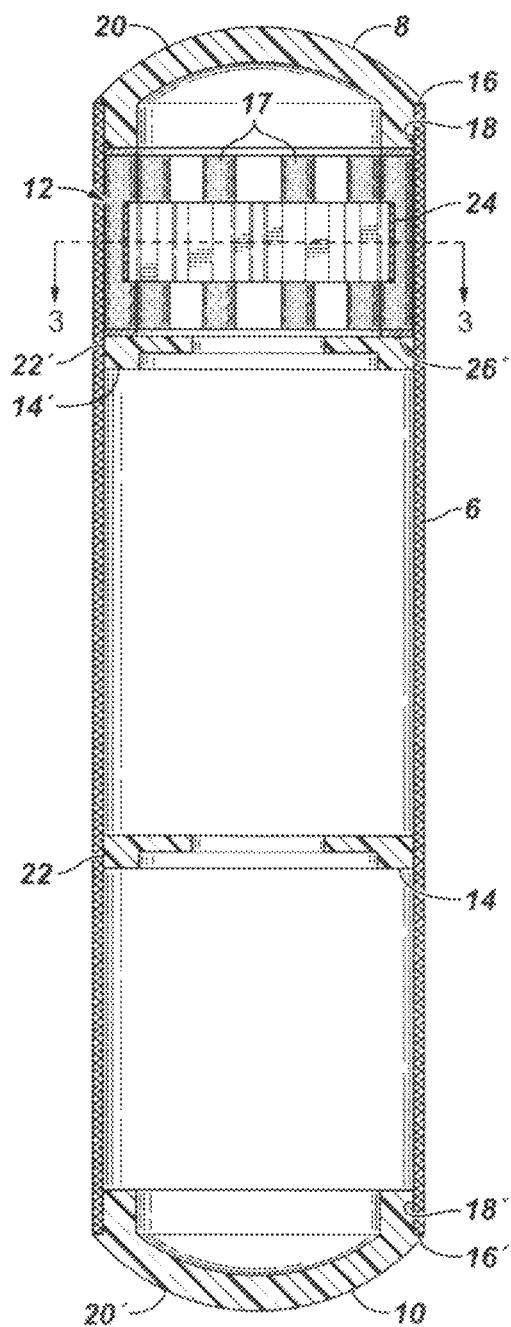
FIG. 2 is a longitudinal sectional view of a float in accordance with an embodiment of the invention.
Figure 3:
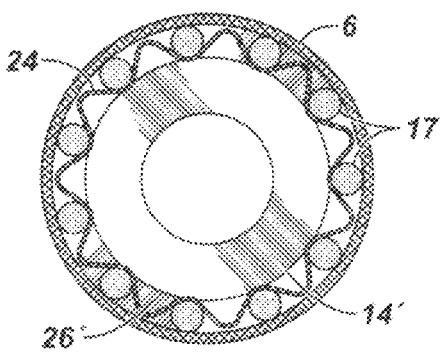
FIG. 3 is a cross sectional view of the float of FIG. 2 view along lines 3-3.

In one embodiment of the invention, there is provided a magnetic float 2 for a level indicator system 4. The float comprises a hollow tube, first and second endcaps 8 and 10, and a magnet assembly 12

The hollow tube comprises a carbon fiber reinforced cured resin matrix and has a first end, a second end, and a longitudinal axis extending between the ends. The first and second endcaps are formed from polymer and are dome-shaped. They seal the first and second ends of the hollow tube, respectively, to hermetically seal the inside of the float the outside.

At least one polymeric reinforcing ring 14 is mounted inside of a midsection of the hollow tube between the first end and the second end to resist radial inward collapse of the tube. In the illustrated embodiment, a second reinforcing ring 14' is mounted near the first end of the tube to position the magnet assembly against the first endcap.

The magnet assembly is mounted in the tube near the first endcap and comprises a plurality of longitudinally elongated magnets 17 positioned adjacent the inside wall of the hollow tube. Each magnet has a longitudinal axis positioned parallel to the longitudinal axis of the hollow tube and is circumferentially spaced from the other magnets.

Overall, the float has an apparent density of less than 0.5 with respect to water. More preferably, the float has a density of about 80% of the liquid in which it will be used, which is usually in the range of 0.3 to 0.4 with respect to water.

In the illustrated embodiment, the magnets are generally cylindrically shaped, like a rod, although other shapes, for example, bars, could be used as well. The magnets can range in number from, for example, 6 to 50, depending on the circumference of the float. Strong permanent magnets are preferred.

Preferably, the carbon fiber comprises a woven fabric, and the resin matrix comprises epoxy resin. Good results can be obtained with in the range of from about 25 to about 45 wt % resin, and in the range of from about 55 to about 75 wt % carbon fiber. The sidewall is preferably formed from prepreg wrapped on a mandrel. A major portion of the fibers run around the tube at an angle in the range of +/−45 to 65 degrees with respect to a normal plane across the tube axis so as to resist pressure on the outside of the tube. The prepreg is compacted as the layup progresses and is wrapped with polyester shrink tape prior to oven curing. The epoxy is selected with a glass transition temperature (Tg) suitable for the intended service temperature of the float, generally in the range of 200 to 400 degrees F.

Preferably, the first endcap and the second endcap each has an inner surface and an outer surface. The outer surface defines an annular wall 16, 16' abutting the end of the tube. A cylindrical section 18, 18' extends from an inner edge of the annular wall which and is received by the tube. The domed section 20, 20' extends from an outer edge of the annular wall and is convex outwardly shaped in a direction away from the cylindrical section. Good results have been obtained by forming both the domed endcaps and the reinforcing rings from fiberglass reinforced epoxy resin. The elements can be secured in position with epoxy adhesive.

The polymeric reinforcing ring 14, 14' is generally washer-shaped and has a longitudinally thickened circumferentially extending rim 22, 22' positioned against an inside surface of the tube.

Although various means could be used to secure the magnets, good results have been obtained by employing a transversely corrugated strip 24 rolled into a band and positioned to bias the plurality of magnets against the inside wall of the tube. A pair of spaced apart washers 26, 26' are preferably positioned to connect adjacent poles of the plurality of magnets at opposite ends and act to improve the magnetic signal.

The float is used in conjunction with a pressure vessel 28 and a vertically positioned pipe 30, the pipe forming a part of the level indicating system 4. The pipe is magnetically permeable and is positioned alongside the pressure vessel. It is in flow communication with the vessel so that a liquid level 32 in the pressure vessel is tracked by a liquid level in the vertically positioned pipe. The magnetic float is positioned in the vertically positioned pipe with a small clearance between an inner wall of the pipe and an outer cylindrical surface of the float so that the float tracks the liquid level in the pipe and the axis of the float stays near vertically positioned.

A magnetic proximity sensor device 34 is positioned for detecting the position of the float in the vertical pipe and providing a signal representative of the position of the float and thus the liquid level in the pressure vessel. The sensor device can be of various types. A flag-type sensor/indicator is illustrated. The flag type sensor/indicator disclosed in my U.S. Pat. No. 6,435,026 issued Aug. 20, 2002, the disclosure of which is incorporated by reference herein, is suitable.

In use, a level of low-density liquid is provided in the pressure vessel and the vertically positioned pipe. Although various density liquids can be monitored, a new application provided by the invention is the ability to monitor levels of liquid having a density in the range of 0.25 to 0.5, preferably in the range of 0.3 to 0.4, with respect to water and which is under a pressure in the range of 100 to 10,000 psig, preferably in the range of 300 to 3,000 psig. The float rides on the surface of the liquid in the vertically positioned pipe, and its position is detected with the magnetic proximity sensor device.

For example, using the invention, the liquid can comprise a volatile constituent selected from the group consisting of liquefied gas from an offshore separator, ethane, ethylene, propane and propylene and the liquid level can be effectively monitored. Good results have been obtained wherein the liquid consists essentially of one or more of the aforementioned constituents. For example, 0.35 specific gravity liquid at 2,000 psig in offshore separators, 0.40 specific gravity liquid at 1,200 psig on propylene units, 0.40 specific gravity liquid on high pressure propane units, have all been effectively monitored.

While certain preferred embodiments of the invention have been described herein, the invention is not to be construed as being so limited, except to the extent that such limitations are found in the claims.

What is claimed is:

1. A magnetic float for a level indicator system, said float comprising
   a hollow tube comprising a carbon fiber reinforced cured resin matrix, said tube having a first end and a second end and a longitudinal axis extending between the ends,
   a polymeric first domed endcap sealing the first end of the hollow tube,
   a polymeric second domed endcap sealing the second end of the hollow tube,
   the inside of said float being hermetically sealed from the outside by the domed endcaps,
   at least one polymeric reinforcing ring mounted inside of a midsection of the hollow tube between the first end and the second end to resist radial inward collapse of the tube, and
   a magnet assembly mounted in the tube near the first end cap, said magnet assembly comprising
   a plurality of longitudinally elongated magnets positioned adjacent the inside wall of the hollow tube near the first end of the hollow tube, each magnet having a longitudinal axis positioned parallel to the longitudinal axis of the hollow tube and being circumferentially spaced apart from the other magnets of the plurality, said float having an apparent density of less than 0.5 with respect to water.

2. A magnetic float as in claim 1 wherein
the carbon fiber comprises a woven fabric, and
the resin matrix comprises epoxy resin.

3. A magnetic float as in claim 1 wherein the tube comprises
   in the range of from about 25 to about 45 wt % resin, and
   in the range of from about 55 to about 75% wt % carbon fiber.

4. A magnetic float as in claim 1 wherein the carbon fiber is wrapped around a mandrel in order to form the tube, and a major portion of the fibers run around the tube at an angle in the range of +/−45 to 65 degrees with respect to the tube axis so as to resist pressure on the outside of the tube.

5. A magnetic float as in claim 1 wherein each of the first endcap and the second endcap has an inner surface and an outer surface, wherein the outer surface defines an annular wall abutting the end of the tube and a cylindrical section extending from an inner edge of the annular wall which is received by the tube, wherein the domed section extends from an outer edge of the annular wall and is convex outwardly shaped in a direction away from the cylindrical section.

6. A magnetic float as in claim 1 wherein the polymeric reinforcing ring is generally washer-shaped and has a longitudinally thickened circumferentially extending rim positioned against an inside surface of the tube.

7. A magnetic float as in claim 1 further comprising a transversely corrugated strip rolled into a band and positioned to bias the plurality of magnets against the inside wall of the tube.

8. A magnetic float as in claim 1 further comprising a pair of spaced apart washers positioned to connect adjacent poles of the plurality of magnets.

9. A magnetic float as in claim 1 wherein the domed endcaps and reinforcing rings are formed from fiberglass reinforced epoxy resin.

10. Apparatus as in claim 1, further comprising, in combination,
    a pressure vessel;
    a magnetically permeable vertically positioned pipe alongside the pressure vessel in flow communication with the vessel so that a liquid level in the pressure vessel is tracked by a liquid level in the vertically positioned pipe,
    wherein the magnetic float is positioned in the vertically positioned pipe with a small clearance between an inner wall of the pipe and an outer surface of the float so that the float tracks the liquid level in the pipe, and
    a magnetic proximity sensor device for detecting the position of the float in the vertical pipe and providing a signal representative of the position of the float and thus the liquid level in the pressure vessel.

11. A method for using an apparatus as in claim 10 comprising
    providing a level of low-density liquid in the pressure vessel and the vertically positioned pipe, said liquid having a density in the range of 0.25 to 0.5 with respect to water and being under a pressure in the range of 100 to 10,000 pisg, said float floating on the surface of the liquid in the vertically positioned pipe, and
    detecting the position of the float with the magnetic proximity sensor device.

12. A method as in claim 11 wherein the liquid has a density in the range of 0.3 to 0.4 with respect to water and is under a pressure in the range of 300 to 3,000 psig.

13. A method as in claim 11 wherein the liquid comprises a volatile constituent selected from the group consisting of liquefied gas from an offshore separator, ethane, ethylene, propane and propylene.

* * * * *